United States Patent [19]

Martin

[11] 4,296,955
[45] Oct. 27, 1981

[54] COMPOSITE COUPLING DEVICE WITH HIGH RECOVERY DRIVER

[75] Inventor: Charles L. Martin, Palo Alto, Calif.

[73] Assignee: Raychem Corporation, Menlo Park, Calif.

[21] Appl. No.: 608,207

[22] Filed: Aug. 27, 1975

Related U.S. Application Data

[63] Continuation-in-part of Ser. No. 404,724, Oct. 9, 1973, abandoned, and a continuation-in-part of Ser. No. 404,723, Oct. 9, 1973, abandoned.

[30] Foreign Application Priority Data

Apr. 9, 1975 [SE] Sweden .................................. 6975040

[51] Int. Cl.³ ............................................. F16L 25/00
[52] U.S. Cl. .................................... 285/381; 285/397; 285/417; 285/422
[58] Field of Search ................ 285/21, DIG. 10, 368, 285/328, 373; 381-423; 156/86; 264/230; 29/447, 521, 508, 526, 516; 174/DIG. 8; 339/DIG. 1, 35; 148/115 R, 13; 138/99; 75/170, 175.5; 403/273, 284, 278, 285; 428/36, 913, 281

[56] References Cited

U.S. PATENT DOCUMENTS

| 317,887 | 5/1885 | Thompson | 339/256 S |
|---|---|---|---|
| 2,258,836 | 10/1941 | Willner | 228/254 |
| 2,772,404 | 11/1956 | Peters | 339/256 S |
| 2,792,560 | 5/1957 | Bullmeier | 339/256 S |
| 2,972,657 | 2/1961 | Stemke | 339/275 R |
| 3,033,600 | 5/1962 | Dryodale | . |
| 3,113,408 | 12/1963 | Kirkpatrick et al. | 29/447 X |
| 3,139,468 | 6/1964 | Wheat | 285/DIG. 10 |
| 3,234,630 | 2/1966 | Kenyon | 29/423 |
| 3,235,289 | 2/1966 | Jones | 285/21 |
| 3,247,315 | 4/1966 | Miller | 339/275 R |
| 3,267,409 | 8/1966 | Horwitz | 339/275 R |
| 3,273,226 | 9/1966 | Braus et al. | 29/423 |
| 3,440,333 | 4/1969 | Blomstrond | 339/256 S |
| 3,513,429 | 5/1970 | Helsup | 285/381 X |
| 3,558,202 | 1/1971 | Lipscomb et al. | 264/230 |
| 3,558,369 | 1/1971 | Wang et al. | 148/115 R |
| 3,559,766 | 2/1971 | Heslop | 174/DIG. 8 |
| 3,567,523 | 3/1971 | Jackson et al. | 148/115 R |
| 3,588,150 | 6/1971 | Wold | 285/381 |
| 3,616,532 | 11/1971 | Beck | 339/17 C |
| 3,675,949 | 7/1972 | Dawson | 285/382.2 |
| 3,740,839 | 6/1973 | Otte | 29/447 X |
| 3,783,037 | 1/1974 | Brook et al. | 148/115 R |
| 3,805,567 | 4/1974 | Sinerco | 285/381 X |
| 3,913,444 | 10/1975 | Otte | 75/175.5 X |

FOREIGN PATENT DOCUMENTS

1627727 1/1970 Fed. Rep. of Germany ...... 285/423
2041807 of 0000 Fed. Rep. of Germany .

Primary Examiner—Dave W. Arola
Attorney, Agent, or Firm—Lyon & Lyon

[57] ABSTRACT

Described herein are composite coupling devices, particularly useful for joining cylindrical substrates. The device comprises a tubular heat recoverable member referred to as a driver that acts upon a second member, usually a sleeve concentrically disposed within the driver, causing the latter to engage the substrate. According to the present invention, the driver has a discontinuous or non-closed cross-section perpendicular to the axis about which it recovers allowing a high percentage of recovery to be imparted to it.

46 Claims, 25 Drawing Figures

COMPOSITE COUPLING DEVICE WITH HIGH RECOVERY DRIVER

RELATED APPLICATIONS

This application is a continuation-in-part of my copending application Ser. No. 404,723 filed Oct. 9, 1973 entitled "Composite Coupling" and a Continuation-in-part of my copending application Ser. No. 404,724 filed Oct. 9, 1973 entitled "Composite Coupling with Gall-Prone Insert," both now abandoned. The disclosure of these applications is incorporated by reference.

FIELD OF THE INVENTION

This invention relates to heat recoverable composite coupling devices.

BACKGROUND OF THE INVENTION

The composite coupling devices described and claimed in my aforementioned applications and my copending British application No. 43684/74, the disclosure of which is also incorporated by reference, comprise a "driver", or heat-recoverable member, made from a memory metal and a second, sleeve member, usually an insert member, which is so constructed, and/or fabricated from such a material, that it enhances the coupling of the composite device to a substrate or substrates. Typically, the "driver" member and the "insert" member are both generally tubular and the insert member is provided with teeth and/or is made from a material with desirable properties, e.g. electrical properties, having regard to the particular application of the composite coupling device.

As is explained in the above applications, "memory metals" are alloys which exhibit changes in strength and configurational characteristics on passing through a transition temperature, in most cases the transition temperature between the martensitic and austenitic states, and can be used to make heat-recoverable articles by deforming an article made from them whilst the metal is in its martensitic, low temperature, state. The article will retain its deformed configuration until it is warmed above the transition temperature to the austenitic state when it will recover towards its original configuration. The deformation used to place the material in the heat-unstable configuration is commonly referred to as thermally recoverable plastic deformation and can also, in certain cases, be imparted by introducing strains into the article above the transition temperature, whereupon the article assumes the deformed configuration on cooling through the transition temperature. It should be understood that the transition temperature may be a temperature range and that, as hysteresis usually occurs, the precise temperature at which transition occurs may depend on whether the temperature is rising or falling. Furthermore, the transition temperature is a function of other parameters, including the stress applied to the material, the temperature rising with increasing stress.

Amongst such memory metals there may especially be mentioned various alloys of titanium and nickel which are described, for example, in U.S. Pat. Nos. 3,174,851, 3,351,463, 3,753,700, 3,759,552, British Pat. Nos. 1,327,441 and 1,327,442 and NASA Publication SP 5110, "55-Nitinol-The Alloy with a Memory, etc" (U.S. Government Printing Office, Washington, D.C. 1972), the disclosures of which are incorporated herein by reference. The property of heat recoverability has not, however, been solely confined to such titanium-nickel alloys. Thus, for example, various copper-based alloys have been demonstrated to exhibit this property in, e.g. N. Nakanishi et al, *Scripta Metallurgica* 5, 433–440 (Pergamon Press 1971) and such materials may be doped to lower their transition temperatures to cryogenic regimes by known techniques. Similarly, 304 stainless steels have been shown to enjoy such characteristics, E. Enami et al, id at pp. 663–68. These disclosures are similarly incorporated herein by reference.

In general, the alloys are chosen to have transition temperatures between the boiling point of liquid nitrogen, $-196°$ C., and room temperature as the lowest temperature likely to be encountered in operation, i.e. between $-196°$ C. and $-75°$ C. in many aerospace applications. This enables the articles made from the alloys to be deformed to the configuration from which recovery is desired, and stored, in liquid nitrogen and yet insures that after heat recovery there is no danger of loss of mechanical strength during use by reason of the article encountering a temperature at which it reverts to the martensitic state.

However, storage of the deformed article in liquid nitrogen is inconvenient. Recently processes have been developed by which metallic compositions, particularly certain copper-based alloys, can have the transition temperature at which they revert to the austenitic state transiently elevated from the normal temperature at which this occurs to a higher temperature, typically above room temperature. Subsequent recovery requires that the article be heated. Such alloys are referred to as being "preconditioned." Procedures by which they are preconditioned are described in U.S. applications by G. B. Brook et al having the same assignee as the present application, filed Feb. 19th 1975 entitled "Heat Treating Method", Ser. No. 550,847, "Mechanical Preconditioning Method", Ser. No. 550,555 and "Austenitic Aging of Metallic Compositions," Ser. No. 550,556, the disclosures of which are incorporated by reference.

As indicated above, by application of a preconditioning process to an alloy its transition temperature can be elevated. However, once recovery has been brought about by heating the article through its new transition temperature, the alloy's response to temperature change reverts to that it possessed prior to preconditioning. Accordingly, it remains austenitic until cooled to the temperature at which transition to martensite normally occurs, typically chosen to be at 0° C. or below depending upon the temperature environment likely to be encountered.

A typical application for the composite couplings described in the aforementioned Martin applications is to join tubular or cylindrical substrates. Properly dimensioned, these couplings can be employed to join substrate that vary greatly in size. For example, they might find application in joining tubing sections that could be used for hydraulic systems in aircraft. They can also be used to join sections of pipe of very large dimension.

As indicated above, the drivers associated with the composite couplings described in the aforementioned Martin applications are generally tubular members. Despite their many useful applications, composite couplings employing them are limited by the amount of recoverable dimensioned change that can be imparted to the drivers which in the case of tubular drivers is on the order of 6–8%. Another shortcoming to the prior art devices is the requirement that the heat recoverable driver be fabricated with a fixed diameter limiting the variations in insert and substrate size it can accommodate.

Accordingly, it is an object of the present invention to provide composite couplings in which the driver is capable of undergoing a high percentage of recovery when compared to composite couplings in which the driver-insert combination are simple tubular members.

Another object of the present invention is to provide a composite coupling in which the driver is capable of being employed with inserts and substrates that vary in dimension.

SUMMARY OF THE INVENTION

The present invention is based on the observation that, in many applications, surprising advantages can be obtained by constructing a driver, for example a tubular driver, from a length of sheet or wire of a memory metal and thus realizing ease of application and, in some cases, dimensional recovery of a degree which cannot be obtained using a closed driver such as an integral tubular sleeve of the type previously employed.

Accordingly, the present invention provides a composite device comprising a first, heat-shrinkable or heat expansible hollow member made from a memory metal of the type described in the Background of the Invention, and a second sleeve member positioned, respectively, inside or outside said first member, said second sleeve member having such a configuration that, and/or being made from such a material that, it enhances the coupling formed between the device and a substrate, wherein the first hollow member has a non-closed cross-section.

DETAILED DESCRIPTION OF THE INVENTION

The hollow heat-recoverable member is preferably tubular. The word "tubular" as used herein is not limited to right cylindrical members but also includes members of irregular and/or of varying cross-section as well as, for example, Y-shaped, T-shaped and X-shaped members, as well as members having one or more closed ends. The member is preferably heat-shrinkable, i.e. its cross-sectional area decreases upon being warmed above the transition temperature of the memory metal, in which case the second sleeve member is an insert. However, in some applications the member is heat-expansible and the second sleeve member is positioned around it.

By a "non-closed cross-section" there is meant that sections perpendicular to the axis of the hollow member (i.e. sections taken in the main plane of shrinkage or expansion) will each show a discontinuity. The hollow member may, for example, be a split ring or tube or a plurality of split rings (washers), but it is preferably a sleeve-like member formed by the wrapping or winding of sheet material or wire.

One advantage to using certain non-closed tubular members as opposed to a closed tubular member is that a greater degree of dimensional recovery can be obtained from the non-closed configuration because a bending deformation utilizing both tensional and compressive strains can be applied to the non-closed configuration whereas, with the closed configuration, it is only possible to apply a tensional or compressive force, not both. This is an especially significant advantage in view of the low degree of recoverable strain (usually not more than 8%) which can be imparted to most memory metals by the application of either tension or compression forces alone. However, it should be recognized that even though such a member is capable of a greater change in dimension than about 8%, upon recovery it exerts less force than a comparable simple tubular member.

A further advantage is that the heat-recoverable member can, if necessary, be made in situ by wrapping or winding preconditioned heat-recoverable sheet or wire and securely anchoring its ends to prevent unwinding upon recovery; thus large diameters and variations in size are readily accommodated. Such preconditioned heat-recoverable materials can be fabricated, for example, by the techniques described in U.S. Application Ser. No. 417,067, referred to previously. Apart from the advantage of versatility, drivers made from these materials are also generally cheaper to manufacture. However, it will be appreciated that the degree of recoverable strain exhibited by a heat recoverable member made in situ by this method will be no greater than the percent strain originally imparted to the heat recoverable sheet or wire.

Yet another advantage, connected with the above, is that non-closed heat-recoverable sleeves can be installed in situ to repair a defect in a continuous substrate such as a pipe. Apart from such installation by wrapping or winding the possibility exists of installing a previously formed helically wound member by serially opening the coils to allow their placement about the substrate in a way similar to that in which a key is fitted onto a key-ring or a spring twisted about a pencil or other elongate object.

Yet another important advantage of the present invention, when the heat-recoverable driver is formed by the helical winding of sheet strip or wire, is that both axial and radial recovery can be obtained and the ratio of axial to radial recovery can be determined by correct choice of the angle of winding. The insert member can then be shaped to accommodate both types of recovery.

In one especially advantageous embodiment of the present invention the driver may be formed from a helically wound spring which may, for example, be loaded in tension and then frozen in this form in the martensitic state. When the spring is so deformed several changes take place: the coils of the spring move apart, the spring wire is twisted torsionally and the diameter of the coils decreases. Upon heating to the austenitic state to effect recovery all these changes are reversed. Thus the spring can be used as an internal driver which upon recovery expands to contact the second sleeve member. Of course, such a spring could also be loaded in compression and could then be used as an external driver which would shrink upon recovery.

In another especially advantageous embodiment of the present invention the driver is a composite formed from two (or more) pre-wound helices preferably of opposite winding. In this way the recovery forces of the two driver components are added and thus an increased recovery force is obtained in addition to the increased dimensional recovery. Also, the resulting coupling has greater flexural strength. It will be appreciated that further windings could be added. In an especially advantageous form of this embodiment a heat-recoverable driver can be formed from many layers of wound preconditioned wire. In this way composite couplings that vary greatly in strength and diameter can be formed.

Many of the advantages discussed above can be even further enhanced by also forming the second sleeve member, e.g. an insert member, in a similar fashion, i.e. so that it has a non-closed cross-section. This considerably facilitates the increase or reduction in size of the sleeve member which occurs upon recovery of the driver. In situations where it is not required that the coupling be particularly fluid tight, an insert member can, for example, be formed as a split tube, but advantageous forms of insert member can be made by the wrapping or winding of sheet, strip or wire. For example, by forming an insert by winding wire of a diamond section to form a sleeve, the corners on the wire section will form helical teeth on the internal and external surfaces of the sleeve. In some cases it may also be advantageous to form the insert member from a resilient spring which would enable a reusable composite device to be made in accordance with the teachings of U.S. Pat. No. 3,783,429. Other suitable inserts can be constructed to change the magnitude or direction of the recovery force in accordance with the teachings of British Pat. No. 1,203,276. To obtain fluid tight couplings, additional sealing means are required.

While emphasis has been made upon drivers according to the present invention which are made from sheet, strip or wires, it will be appreciated that most of the advantages can be obtained by using drivers which are preformed to have a non-closed cross-section, such as split tubes and rings. Another possibility is to form the driver from a composite tape consisting of preconditioned heat-recoverable wires embedded in a plastics material, which is also preferable heat-recoverable.

It will be appreciated that the present invention incorporates the general teachings and disclosures of British Patent Application No. 43684/74 and corresponding U.S. Applications Ser. Nos. 404,723 and 404,724 referred to above and, in particular, that the insert member may be made in accordance with the teachings therein.

Various embodiments according to the present invention will now be described in more detail, by way of example only, with reference to the accompanying drawings, in which, by brief description.

FIGS. 9a to 9c illustrate the application of the present invention to a device having a spirally wound recoverable member.

Figure 1:
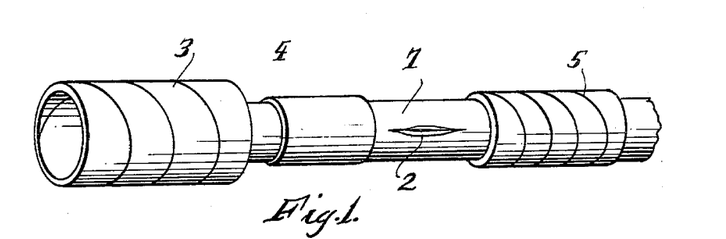
FIG. 1 illustrates the use of a composite coupling device to repair a damaged substrate.
Figure 2:
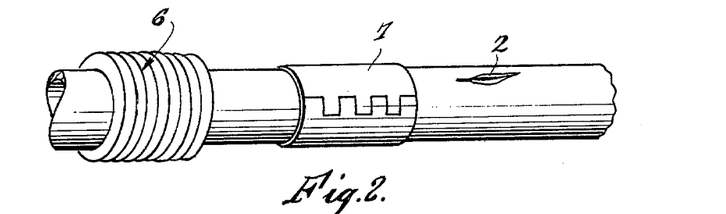
FIG. 2 illustrates a second form of composite coupling device which can be used for the same purpose.
Figure 3:
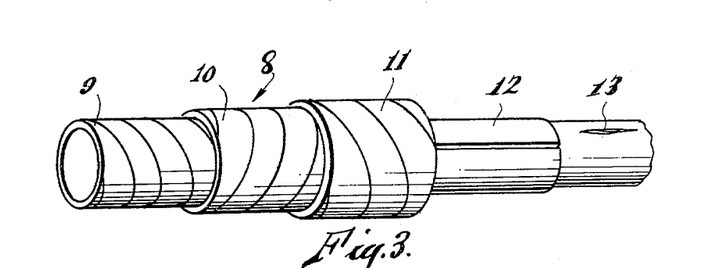
FIG. 3 illustrates a third form of composite coupling device.

Referring to the drawings:

FIGS. 1 to 3 illustrate the use of the composite devices according to the present invention for repairing continuous substrates. As shown in FIG. 1 a continuous tubular substrate 1 has a small split 2 along its length. To repair this split a heat-recoverable driver 3 is used which has been made by helically winding sheet strip. The driver 3 may be made heat-shrinkable either by winding preconditioned shrinkable strip or else by deforming a pre-wound driver, for example by mandrel expansion. The driver 3 may be placed about the continuous tubular substrate either by winding in situ or else by locating a previously formed helical driver upon the substrate by serially opening the coils of the helix to allow their placement about the substrate in a manner analogous to the fixing of a key upon a key ring or the winding of a spring about a pencil. The insert member may comprise a patch 4 which is positioned over the split 2 or else may be itself formed as a helically wound sleeve 5 which can be positioned over the tubular substrate either by winding in situ or else in the manner described above. The strip material from which the helix is wound should be wide enough to seal the repair area. Upon recovery, the driver shrinks and thus causes secure engagement of the insert about the substrate to repair the damaged area. In the case of a driver that has been wound in situ, the ends must be securely attached to the substrate or insert to prevent its unwinding during recovery. Any suitable means can be used. For example, if the driver is wound from wire, its ends can be wrapped about posts or pins. A driver wound from strip might have holes at either end to engage a post.

In FIG. 2 there is shown an analogous device in which the driver 6, which may be a spring as described above, is formed from a helically wound wire and the insert sleeve 7 has been made by rolling metal sheet to form a tube by a tongue-and-groove connection. For large tubular substrates, the insert sleeve 7 will typically be formed in two halves. Preferably, the halves are joined by a pinned hinge.

FIG. 3 illustrates a device according to the present invention in which the driver 8 is formed as a composite by three overlapping windings 9, 10 and 11 of preconditioned heat-shrinkable sheet strip. As is shown, each of the three layers of the composite driver is wound in a direction opposite to that of the adjacent layers. Preferably the windings are lubricated to reduce the friction between them as they recover. Such an arrangement increases the recovery force of the driver. The insert 12 comprises a split tube which is positioned within the driver 8 and about the damaged area 13 in the continuous tubular substrate. As in the embodiments shown in FIGS. 1 and 2, the insert member may be provided on its internal surface with teeth to facilitate secure connection with the tubular substrate. Alternatively, it may be made from a gall-prone material or may be otherwise constructed or made from a material such that secure coupling and proper repair is facilitated.

For optimal attainment of the advantage conferred by the use of gall-prone inserts, the surface roughness of the insert is desirably made like that of one or more of the surfaces it adjoins in the particular application. For example, for the hydraulic conduitry for which the composite couplings are preferably employed, the generally uniform surface of the insert preferably exhibits profilometer roughness not greater than about 125 micro-inches, most preferably not greater than about 63 micro-inches.

Figure 4:
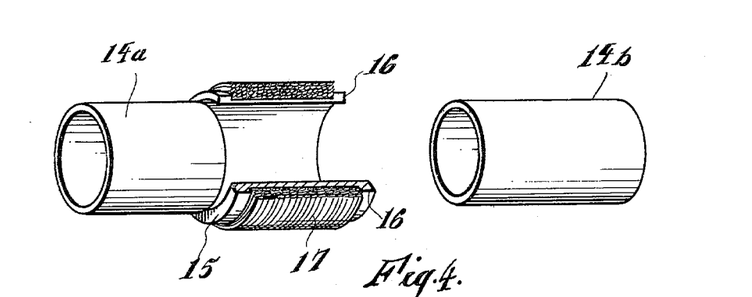
FIG. 4 illustrates the use of a composite coupling device to effect a connection.

In FIG. 4 there is shown a modification of the device of FIG. 3 which may be used for coupling oil pipelines 14a and 14b. As is shown, the device comprises a generally tubular insert 15 which may be formed as a tube provided with terminal exterior flanges 16. Within the area formed by the flanges 16a heat-recoverable driver member 17 is formed by a series of discrete windings of heat-recoverable wire preconditioned wires may suitably be made from brass or other copper alloys as described, for example, in U.S. Patent Applications of Brook et al referred to above. Upon recovery, the shrinkage of the wires causes the insert to decrease in diameter and the device then forms a firm connection between the pipe substrates 14a and 14b. As mentioned above, the insert may be provided with teeth or may be otherwise constructed or made to enhance connection. A significant advantage of the device shown in this embodiment is that connections of varying and large diameter can easily be made by simply winding and anchoring preconditioned wire about suitably dimensioned inserts.

Figure 5A:
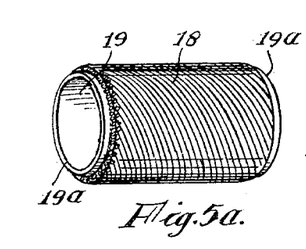
FIG. 5 illustrates the recovery properties of a wound composite coupling device.
Figure 5B:
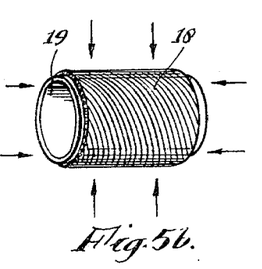

FIGS. 5a and 5b show how by appropriate winding of the driver member both axial and radial recovery may be obtained in a predetermined ratio. In FIG. 5a there is shown at heat-recoverable device comprising a driver member 18 formed about an insert member 19 by the helical winding of a plurality of preconditioned heat-recoverable wire sections. Each wire is wound at an angle α relative to the radial plane of the tubular device and fixedly held at its ends by heat recoverable bands 19a at the ends of the insert. Such bands would of necessity have a recovery temperature below that of the wire sections. FIG. 5b shows the device after recovery, the arrows indicating the directions of recovery. It will be seen that the device has shrunk both radially and axially and it will be appreciated therefore that the insert member 19 is constructed to accommodate both radial and axial shrinkage. Suitable constructions will be apparent to those skilled in the art, the insert 19 may, for example, be constructed from two separate parts for this purpose.

Figures 6A, 6B:
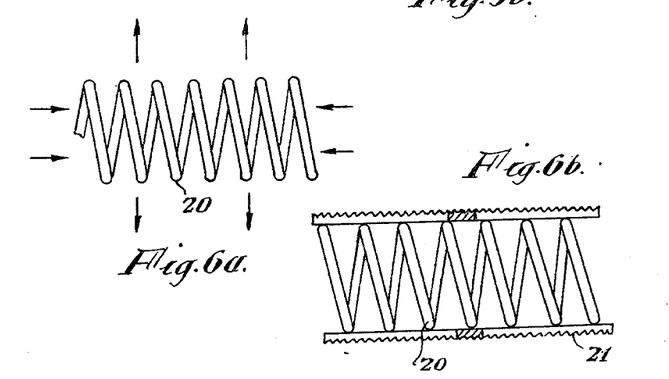
FIGS. 6a and 6b illustrates a further form of composite coupling device.

FIGS. 6a and 6b illustrate the use of a helically wound spring as the driver in the present invention. As shown in FIG. 6a, the device comprises a helical spring 20 which has been loaded in tension and which, upon recovery, will move in the directions shown by the arrows, i.e. it will expand radially and shrink axially. The sleeve member 21 as shown is a toothed cylinder having longitudinal terminal slots. FIG. 6b shows the driver 20 positioned in the sleeve prior to recovery. The driver 20 can expand radially and force the sleeve 21 to radially enlarge near its ends to assume an hourglass configuration. Such a device can be used for the internal connection of tubular substrates and, for this purpose, the sleeve 21 may be formed or provided with teeth on its external surface as shown or made from a gall-prone material. It will be appreciated that a similar, but heat-shrinkable, device could be formed by utilizing a compressed driver spring and an insert sleeve with interior teeth.

FIGS. 7a to 7h illustrate the use of the present invention with inserts which can utilize the recovery forces of a wound, non-circular, e.g., elliptical in shape, driver member to form a firm connection between square, rectangular or other polygonal substrates.

Figure 7A:
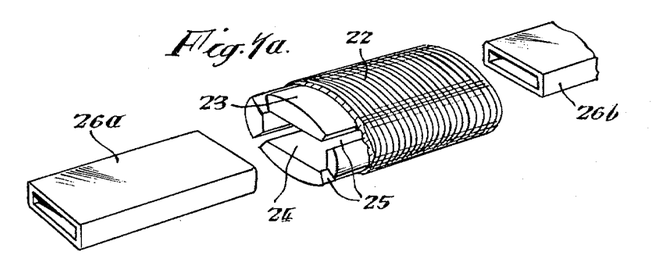
FIGS. 7a to 7h illustrates another form of device for connecting tubular substrates.
Figure 7B:
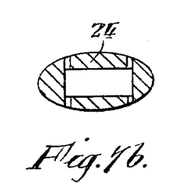
Figure 7C:
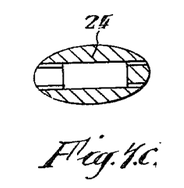
Figure 7D:
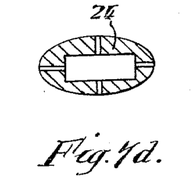
Figure 7E:
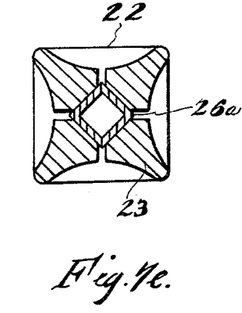
Figure 7F:
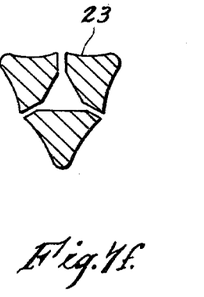
Figure 7G:
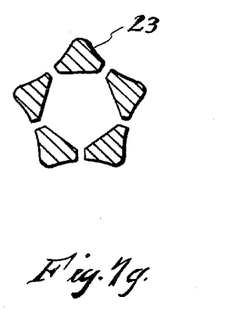
Figure 7H:
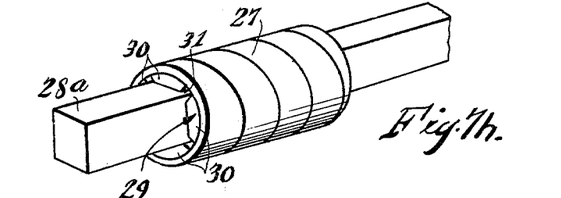

Referring to FIG. 7a there is shown a device comprising a wound elliptical heat-recoverable driver 22 containing an insert 23 which is provided with a rectangular aperture 24 throughout its length and is provided with four longitudinal slots 25 at each corner of said aperture. Such a device may be used to connect the two rectangular substrates 26a and 26b. FIGS. 7b to 7g show alternative forms of the insert member 23, FIGS. 7e and 7f being adapted for substrates other than square or rectangular. As shown in FIG. 7h, a similar arrangement can be used to utilize the recovery force of a wound tubular driver 27 to connect square substrates 28a and 28b. Here the insert is formed as a tube 29, which may be split longitudinally, containing further auxiliary insert members 30 forming a square aperture throughout the length of the device and forming longitudinal slots 31 at the corners of said square aperture. To obtain a more fluid tight seal, slots 31 can be filled with mastic or soft rubber material. The devices shown in FIGS. 7a to 7h are useful because drivers formed by winding preconditioned heat-recoverable wires are easily fabricated. It will be appreciated that such devices can be applied to substrates of other cross-sections, such as hexagonal, and that the inserts or auxiliary inserts may be provided with teeth or may be otherwise constructed or made to facilitate connection as by being made from gall-prone material.

Figure 8:
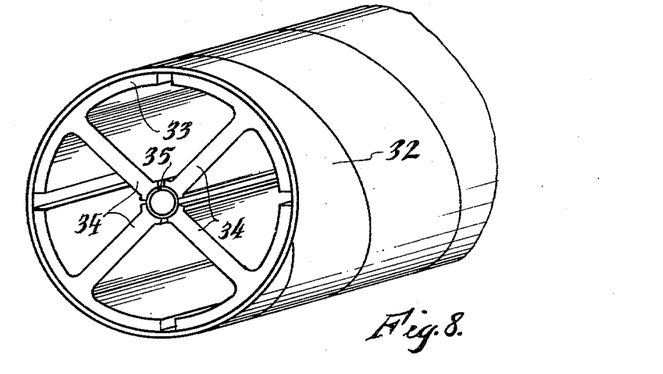
FIG. 8 illustrates another composite device in which the insert acts to modify the recovery force.

FIG. 8 shows a device according to the present invention in which a heat-recoverable tubular driver 32 formed by helically winding sheet material is provided with an insert member 33 which is provided with four internal radial arms 34 which enable the recovery force of the driver 32 to be transmitted to a tubular substrate 35 of much smaller diameter. Such device could also be formed using a generally tubular or split tubular insert member and one or more suitably constructed auxiliary insert members in accordance with the teachings of British Patent Application No. 43684/74.

Figure 9A:
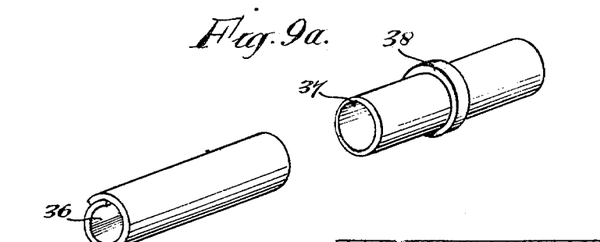
Figure 9C:
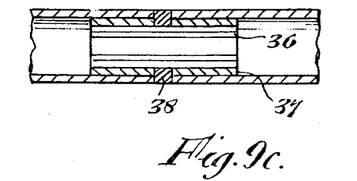

FIGS. 9a to 9c illustrate yet another device according to this invention in which a heat recoverable device 36 is formed by spirally winding sheet material. Such a driver can be rendered heat shrinkable by deforming it to a larger diameter or made to expand radially by compressing it to a smaller diameter. A larger percentage of recovery is possible using such drivers than can be achieved with simple cylindrical drivers and are better able to conform to out of round shapes or tapered shapes. FIG. 9b depicts a tubular driven member 37 having collar 38 which can be used with a driver 36 capable of undergoing radial expansion as an internal coupling for cylindrical substrates. The cross-section of such a coupling is shown in FIG. 9c. Member 37 can be provided with teeth or be made from a gall-prone material to strengthen the coupling with the substrate. To facilitate its deformation, member 37 may also be provided with longitudinal terminal slits like those provided driven member 21 shown in FIG. 6b.

Figure 10A:
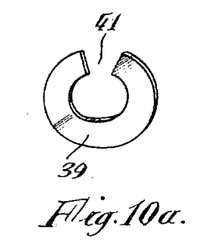
FIGS. 10a to 10f illustrate another form of the device of this invention.
Figure 10B:
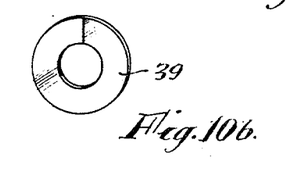
Figures 10C, 10D, 10E, 10F:
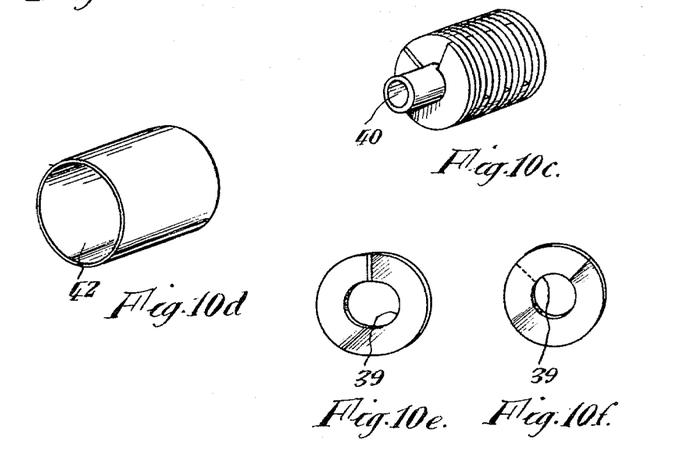

FIGS. 10a to 10f depict a variant form of device according to this invention in which heat-recoverable members comprises a plurality of split rings or washers 39 shown in the heat-recoverable form in FIG. 10a and as recovered in FIG. 10b. An assembly of washers prior to recovery is shown in FIG. 10c with an insert 40, which for example may be toothed or gall-prone, positioned within the aperture formed by the washers. As shown in FIG. 10c, preferably the openings 41 to the washers are indexed (90° in FIG. 10c) to avoid having a gap in the assembly. A covering 42 for the washer assemblage such as shown in FIG. 10d is required to keep the washers together and in the proper orientation. The covering can be of any suitable material including metals or polymeric material. Typically the covering is selected for its corrosion resistance or other desirable property. Another suitable configuration for washer 39 before and after recovery is shown in FIGS. 10e and 10f. In this configuration, the ends of the washer overlap during recovery.

Emphasis has been made in the foregoing description upon the use of preconditioned heat-recoverable materials which can be recovered by heating above room temperature. However, it will be appreciated that the present invention is not limited to such preconditioned heat-recoverable materials and that alloys having transition temperatures below ambient temperature (23° C.) may also advantageously be utilized in the present invention.

From the foregoing description of the drawings it will be recognized that the devices of the present invention lend themselves to many applications. For example, they can be employed to couple fluid carrying tubular substrates such as sections of pipeline. They may also be employed to couple other elongate substrates as well. Such substrates include hollow or solid cylindrical structural members. The aforementioned applications are but illustrative of the many advantages the present invention provides.

I claim:
1. A composite device which comprises:
   (a) a hollow, heat-recoverable, helical spring member made from helically wound sheet or wire of memory metal, said heat-recoverable member having a cross-section such that sections perpendicular to the axis of the heat-recoverable member each show a discontinuity; and
   (b) a hollow sleeve, open at both ends, disposed coaxially with said heat-recoverable member, and adapted to be deformed to grip a substrate, said deformation resulting from force exerted on the sleeve by the heat-recoverable member when the heat-recoverable member is heated above its transition temperature and recovers in the direction of said sleeve.

2. A composite device as in claim 1 wherein the hollow heat-recoverable member is right cylindrical.

3. A composite device as in claim 1, wherein the coil spring member has been deformed by compression.

4. A composite device as in claim 1, wherein the coil spring member has been deformed by tension.

5. A composite device as in claim 1, wherein the heat-recoverable member is formed from at least two discrete layers of wound sheet or wire.

6. A composite device as in claim 1, wherein the memory metal has a recovery temperature above ambient temperature.

7. A composite device as in claim 6, wherein the memory metal has been preconditioned.

8. A composite device as in claim 1, wherein the sleeve also has a cross-section such that sections perpendicular to the axis of the sleeve each show a discontinuity.

9. A composite device as in claim 8, wherein the sleeve is formed from spirally wound sheet or wire.

10. A composite device as in claim 8, wherein the sleeve is a split tube.

11. A composite device as in claim 8, wherein the sleeve is formed from helically wound sheet or wire.

12. A composite device as in claim 1, wherein the sleeve is resilient.

13. A composite device as in claim 1 wherein the sleeve is disposed within said recoverable member, said recoverable member being heat-shrinkable.

14. A composite device as in claim 1 wherein said sleeve is disposed about said heat-recoverable member, said recoverable member being heat-expandable.

15. A composite device as in claim 1, wherein the sleeve is made from a gall-prone metal.

16. A composite device as in claim 15 wherein a principal surface of the sleeve exhibits profilometer roughness not greater than about 125 micro-inches.

17. A composite device as in claim 16 wherein a principal surface of the sleeve exhibits profilometer roughness not greater than about 63 micro-inches.

18. A composite device as in claim 1, wherein the sleeve has teeth on at least one of its principal surfaces.

19. A composite device which comprises:
   (a) a hollow heat-recoverable member formed from at least two layers of helically wound sheet or wire of memory metal, wherein the winding of one layer is of a hand opposite to the winding in an adjacent layer, said heat-recoverable member having a cross-section such that sections perpendicular to the axis of the heat-recoverable member each show a discontinuity; and
   (b) a hollow sleeve, open at both ends, disposed coaxially with said heat-recoverable member, and adapted to be deformed to engage a substrate, said-deformation resulting from force exerted on the sleeve by the heat-recoverable member when the heat-recoverable member is heated above its transition temperature and recovers in the direction of the sleeve.

20. A hollow, heat-recoverable device comprising a plurality of helically wound overlapping layers of heat-recoverable sheet or wire made from a memory metal wherein the winding of one layer is of a hand opposite the winding in an adjacent layer, said heat-recoverable device having a cross-section such that sections perpendicular to the axis of the heat-recoverable device each show a discontinuity.

21. A device according to claim 20 wherein the memory metal has a recovery temperature above ambient temperature.

22. A device according to claim 21 wherein the memory metal has been preconditioned.

23. A composite device for coupling a pair of substrates comprising:
   (a) a hollow, heat-shrinkable, radially expanded helical spring member made from helically wound sheet or wire of memory metal, said heat-shrinkable member having a cross-section such that sections perpendicular to the axis of the heat-shrinkable member each show a discontinuity; and
   (b) a hollow sleeve disposed coaxially within said heat-shrinkable member, said sleeve open at both ends to receive said substrates to be joined, and adapted to be deformed to grip said substrates and form a union therebetween, said deformation resulting from force exerted on the sleeve by the heat-shrinkable member when the heat-shrinkable member is heated above its transition temperature and shrinks about said sleeve.

24. A device according to claim 23 wherein the heat-shrinkable member is right cylindrical.

25. A device according to claim 23 wherein the heat-shrinkable member is comprised of at least two layers of helically wound sheet or wire.

26. A device according to claim 25, wherein the winding of one layer is of a hand opposite the winding of an adjacent layer.

27. A composite device which comprises:
   (a) A hollow heat-recoverable member comprising a plurality of split rings made from a memory metal, said heat-recoverable member having a cross-section such that sections perpendicular to the axis of the heat-recoverable member each show a discontinuity; and (b) a hollow sleeve, open at both ends, disposed coaxially with said heat-recoverable member and adapted to be deformed to grip a substrate, said deformation resulting from force exerted on the sleeve by the heat-recoverable member when the heat-recoverable member is heated above its transition temperature and recovers in the direction of the sleeve such that it contacts said sleeve.

28. A composite device as in claim 27, wherein the sleeve is made from a gall-prone metal.

29. A composite device as in claim 28 wherein a principal surface of the sleeve exhibits profilometer roughness not greater than about 125 micro-inches.

30. A composite device as in claim 29 wherein a principal surface of the sleeve exhibits profilometer roughness not greater than about 63 micro-inches.

31. A composite device as in claim 27, wherein the sleeve has teeth on at least one of its principal surfaces.

32. A composite device as claimed in claim 27 wherein the heat-recoverable member further comprises a cylindrical cover for maintaining said rings in a stacked relationship.

33. A composite device for coupling a pair of substrates comprising:

(a) a hollow heat-shrinkable member comprising a plurality of split rings made from a memory metal, said heat-shrinkable member having a cross-section such that sections perpendicular to the axis of the heat-shrinkable member each show a discontinuity; and (b) a hollow sleeve disposed coaxially within said heat-shrinkable member, said sleeve open at both ends to receive said substrates to be joined, and adapted to be deformed to grip said substrates and form a union therebetween, said deformation resulting from force exerted on the sleeve by the heat-shrinkable member when the heat-shrinkable member is heated above its transition temperature and shrinks about said sleeve.

34. A composite device according to claim 33 where the heat-shrinkable member further comprises a cylindrical cover for maintaining said rings in a stacked relationship.

35. A composite device which comprises:

(a) a tubular, hollow, heat-recoverable spiral spring member made from spirally wound sheet or wire of memory metal, said heat-recoverable member having a cross-section such that sections perpendicular to the axis of the heat-recoverable member each show a discontinuity; and (b) a hollow sleeve, open at both ends, disposed coaxially with said heat-recoverable member, and adapted to be deformed to grip a substrate, said deformation resulting from force exerted on the sleeve by the heat-recoverable member when the heat-recoverable member is heated above its transition temperature and recovers in the direction of said sleeve.

36. A composite device as in claim 35, wherein the sleeve is made from a gall-prone metal.

37. A composite device as in claim 36 wherein a principal surface of the sleeve exhibits profilometer roughness not greater than about 125 micro-inches.

38. A composite device as in claim 37 wherein a principal surface of the sleeve exhibits profilometer roughness not greater than about 63 micro-inches.

39. A composite device as in claim 35, wherein the sleeve has teeth on at least one of its principal surfaces.

40. A composite device as in claim 35, wherein the heat-recoverable member is formed from at least two discrete layers of wound sheet or wire.

41. A composite device as in claim 35, wherein the memory metal has been preconditioned.

42. A composite device as in claim 35, wherein the sleeve also has a cross-section such that sections perpendicular to the axis of the sleeve each show a discontinuity.

43. A composite device as in claim 42, wherein the sleeve is a split tube.

44. A composite device as in claim 42, wherein the sleeve is formed from helically wound sheet or wire.

45. A composite device as in claim 42, wherein the sleeve is formed from spirally wound sheet or wire.

46. A composite device for coupling a pair of substrates comprising:

(a) a hollow, heat-shrinkable, spiral spring member made from spirally wound sheet or wire of memory metal, said heat-shrinkable member having a cross-section such that sections perpendicular to the axis of the heat-shrinkable member each show a discontinuity; and (b) a hollow sleeve disposed coaxially within said heat-shrinkable member, said sleeve open at both ends to receive said substrates to be joined, and adapted to be deformed to grip said substrates and form a union therebetween, said deformation resulting from force exerted on the sleeve by the heat-shrinkable member when the heat-shrinkable member is heated above its transition temperature and shrinks about said sleeve.

* * * * *